US012646388B2

(12) United States Patent
Bucci et al.

(10) Patent No.: US 12,646,388 B2
(45) Date of Patent: Jun. 2, 2026

(54) LOTTERY TICKET VENDING MACHINE

(71) Applicant: Brightstar Global Solutions Corporation, Providence, RI (US)

(72) Inventors: Paul A. Bucci, Glocester, RI (US); Stewart Thoeni, Reno, NV (US)

(73) Assignee: Brightstar Global Solutions Corporation, Providence, RI (US)

( * ) Notice: Subject to any disclaimer, the term of this patent is extended or adjusted under 35 U.S.C. 154(b) by 363 days.

(21) Appl. No.: 18/364,553

(22) Filed: Aug. 3, 2023

(65) Prior Publication Data

US 2025/0046158 A1 Feb. 6, 2025

(51) Int. Cl.

*G07F 17/42* (2006.01)
*G07C 15/00* (2006.01)
*G07F 17/32* (2006.01)

(52) U.S. Cl.

CPC ........... *G07F 17/42* (2013.01); *G07C 15/005* (2013.01); *G07F 17/329* (2013.01)

(58) Field of Classification Search

CPC ..... B26F 3/00; B65H 2701/1936; G07B 5/02; G07C 15/005; G07F 11/68; G07F 11/1653; G07F 17/42; G07F 17/329

See application file for complete search history.

(56) References Cited

U.S. PATENT DOCUMENTS 3,855,457 A 12/1974 Amundson et al.
4,456,148 A * 6/1984 Newman ................ G07F 13/10 221/265
4,928,133 A 5/1990 Fulton
5,127,720 A 7/1992 Shultz
5,222,624 A 6/1993 Burr
5,268,561 A * 12/1993 Kimura .................... G07B 1/00 235/449
5,408,417 A 4/1995 Wilder
5,534,690 A 7/1996 Goldenberg et al.
5,836,498 A 11/1998 Turek
6,157,457 A 12/2000 Van
6,269,285 B1 * 7/2001 Mignault .............. A47F 3/0439 206/745
6,609,644 B1 8/2003 Menna
6,712,253 B2 3/2004 Hargrave et al.
6,714,838 B2 3/2004 Scrymgeour et al.
6,726,077 B2 4/2004 Roberts et al.
6,871,755 B2 3/2005 Devries et al.
6,957,746 B2 * 10/2005 Martin ................ G06K 13/103 235/380
6,994,230 B2 * 2/2006 Sams ...................... G07F 11/42 312/35
7,032,774 B2 4/2006 Boehm et al.
7,383,099 B2 6/2008 Pollard et al.
7,467,738 B2 12/2008 Woods et al.

(Continued)

OTHER PUBLICATIONS

"Extended European Search Report", from corresponding European Patent Application No. 24192028.9, Dec. 4, 2024.

*Primary Examiner* — Gene O Crawford
*Assistant Examiner* — Kelvin L Randall, Jr.
(74) *Attorney, Agent, or Firm* — Neal, Gerber & Eisenberg LLP

(57) ABSTRACT

A lottery ticket vending machine configured to determine, for each of a plurality of ticket drawers, if lottery tickets are in the ticket drawer, and to take one or more actions based on such determinations.

17 Claims, 11 Drawing Sheets

(56) References Cited

U.S. PATENT DOCUMENTS

| | | | |
|---|---|---|---|
| 7,562,798 | B2 | 7/2009 | Bartolone et al. |
| 7,665,394 | B2 | 2/2010 | Roberts et al. |
| 7,850,257 | B2 | 12/2010 | Roberts et al. |
| 8,127,973 | B2 | 3/2012 | Mirkovic et al. |
| 8,192,268 | B1 | 6/2012 | Karpe |
| 8,210,921 | B1 | 7/2012 | Karpe |
| 8,534,524 | B2 | 9/2013 | Businger et al. |
| 8,550,294 | B2 | 10/2013 | Martin |
| 9,613,337 | B1 | 4/2017 | Garrison |
| 9,685,026 | B1 | 6/2017 | Garrison |
| 10,438,452 | B2 | 10/2019 | Ferron et al. |
| 11,010,987 | B2 | 5/2021 | Bucci |
| 2003/0120381 | A1 | 6/2003 | Perin et al. |
| 2004/0000572 | A1 | 1/2004 | Engelhardt, Jr. et al. |
| 2005/0178810 | A1 | 8/2005 | Woods et al. |
| 2007/0017978 | A1 | 1/2007 | Ho |
| 2007/0088459 | A1 | 4/2007 | Pollard et al. |
| 2010/0308071 | A1 | 12/2010 | Businger |
| 2011/0042403 | A1* | 2/2011 | Martin ..................... B65H 5/04 221/124 |
| 2012/0085777 | A1 | 4/2012 | Bucci et al. |
| 2014/0008407 | A1 | 1/2014 | Bucci et al. |
| 2016/0232741 | A1 | 8/2016 | Assis et al. |
| 2018/0108203 | A1* | 4/2018 | Li ....................... G07F 11/1653 |
| 2018/0186558 | A1 | 7/2018 | Mejenborg et al. |
| 2021/0110630 | A1 | 4/2021 | Mejenborg et al. |
| 2022/0108562 | A1* | 4/2022 | Claude .................. G07F 17/329 |
| 2022/0114842 | A1 | 4/2022 | Mejenborg et al. |
| 2022/0114860 | A1 | 4/2022 | Mejenborg et al. |
| 2024/0021054 | A1 | 1/2024 | Topalian et al. |

* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer in the housing, the ticket drawer configured to hold lottery tickets; a ticket indicator assembly including a ticket engaging roller in the ticket drawer and a movable gauge connected to the ticket drawer; a ticket burster in the housing, the ticket burster defining a ticket inlet and a ticket outlet, the ticket burster movable to a position associated with and the ticket drawer; a sensor supported by the ticket burster, configured to sense a position of the gauge to obtain data based on a quantity of lottery tickets in the ticket drawer, and configured to transmit the data; and a controller configured to receive the data from the sensor, and determine the quantity of lottery tickets in the ticket drawer.

In various other embodiments, the present disclosure relates to a lottery ticket vending machine including: a housing; a plurality of ticket drawers in the housing, each ticket drawer configured to hold lottery tickets; a plurality of ticket indicator assemblies in the housing, each ticket indicator assembly associated with a different one of the drawers; a ticket burster in the housing, the ticket burster defining a ticket inlet and a ticket outlet, the ticket burster movable to different positions respectively associated with the ticket drawers; and a sensor supported by the ticket burster, the sensor configured to, for each of the ticket drawers, sense a position of part of the ticket indicator assembly associated with that ticket drawer to obtain data based on a quantity of lottery tickets in the ticket drawer, and configured to transmit the data to a controller to determine a quantity of lottery tickets in the ticket drawer.

In various other embodiments, the present disclosure relates to a lottery ticket vending machine including: a housing; a ticket drawer in the housing configured to hold lottery tickets; a ticket indicator assembly connected to the ticket drawer; a ticket burster in the housing, the ticket burster defining a ticket inlet and a ticket outlet, the ticket burster movable to a position associated with and the ticket drawer; a sensor supported by the ticket burster, configured to sense a position of part of the ticket indicator assembly, and configured to transmit data based on the position of the part of the ticket indicator assembly; and a controller configured to receive the data from the sensor, and determine a quantity of lottery tickets that are in the ticket drawer.

Additional features are described in, and will be apparent from, the following Detailed Description and the figures.

DETAILED DESCRIPTION

Figure 1:
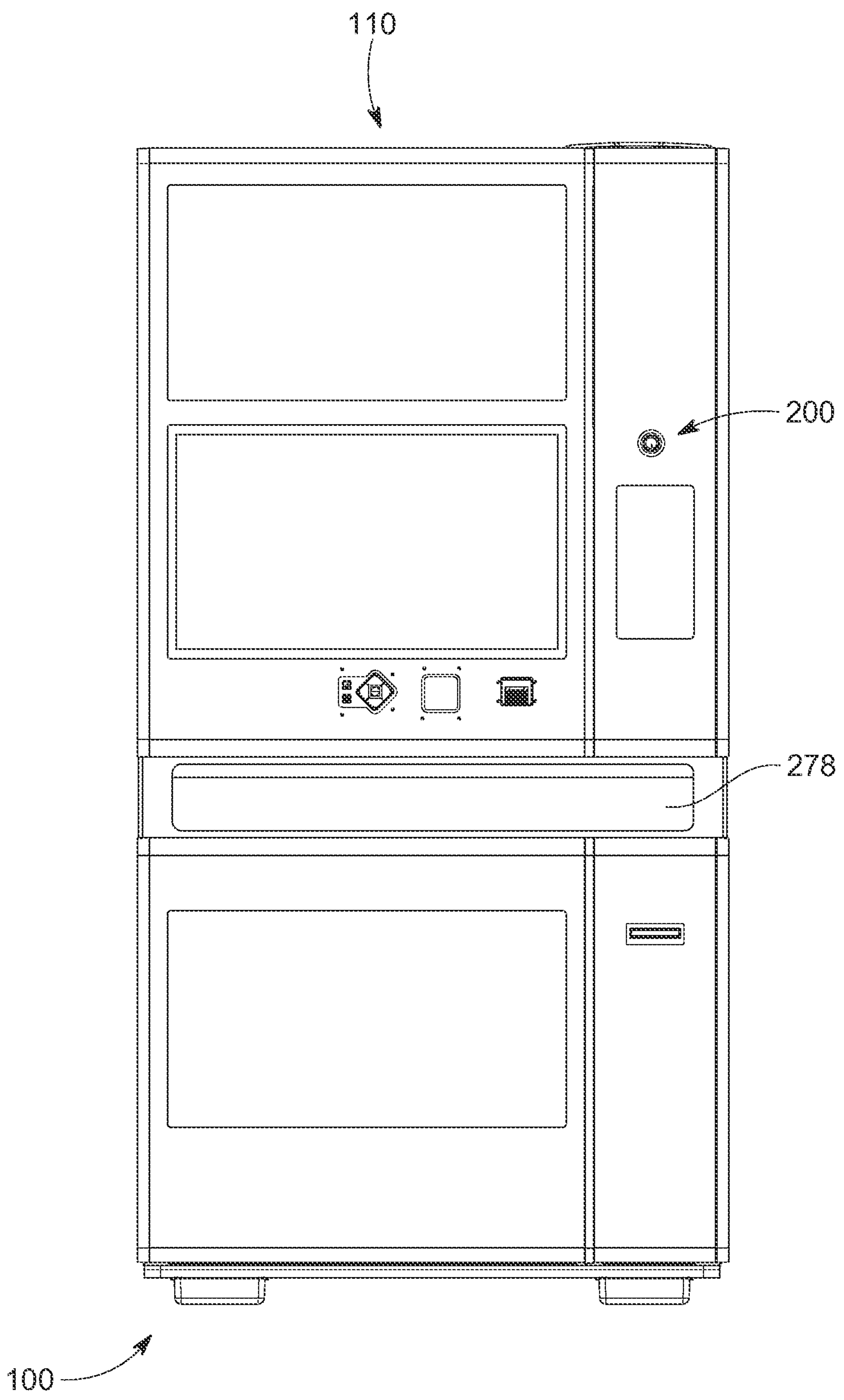
FIG. 1 is a front perspective view of a lottery ticket vending machine of one example embodiment of the present disclosure shown with a front door thereof in a closed position.

In various embodiments, the present disclosure relates to a lottery ticket vending machine that is configured to determine an exact quantity or an approximate quantity of lottery tickets positioned in each of a plurality of ticket drawers of the lottery ticket vending machine. In various embodiments, each of the ticket drawers includes a ticket indicator assembly configured to indicate if lottery tickets are in that ticket drawer and at least a general indication such as an approximation of the quantity of lottery tickets that are in that ticket drawer. In various embodiments, the ticket indicator assembly of or for each ticket drawer includes an indicator configured to be sensed by a sensor of the burster. In various embodiments, each of the ticket bursters of the lottery ticket vending machine includes a sensor configured to be aligned with each ticket drawer of a drawer column to sense the indicator of the ticket indicator assembly of that ticket drawer to determine one or more of the indication(s) by the ticket indicator assembly for that ticket drawer. In various embodiments, the lottery ticket vending machine includes one or more controllers configured to receive data from the sensors, analyze such data, and make determinations regarding any actions to take based on that data.

For a better understanding of the present disclosure, example instant lottery tickets are first generally described herein.

Various known instant lottery tickets are single game instant lottery tickets. An example single game instant lottery ticket can include: (1) a ticket substrate have a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or lottery ticket retailers, and activation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

FIGS. 1 to 14 illustrate a lottery ticket vending machine 100 of one example embodiment of the present disclosure. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the determination of tickets in the ticket drawers and the dispensing of each requested lottery ticket from those drawers. The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
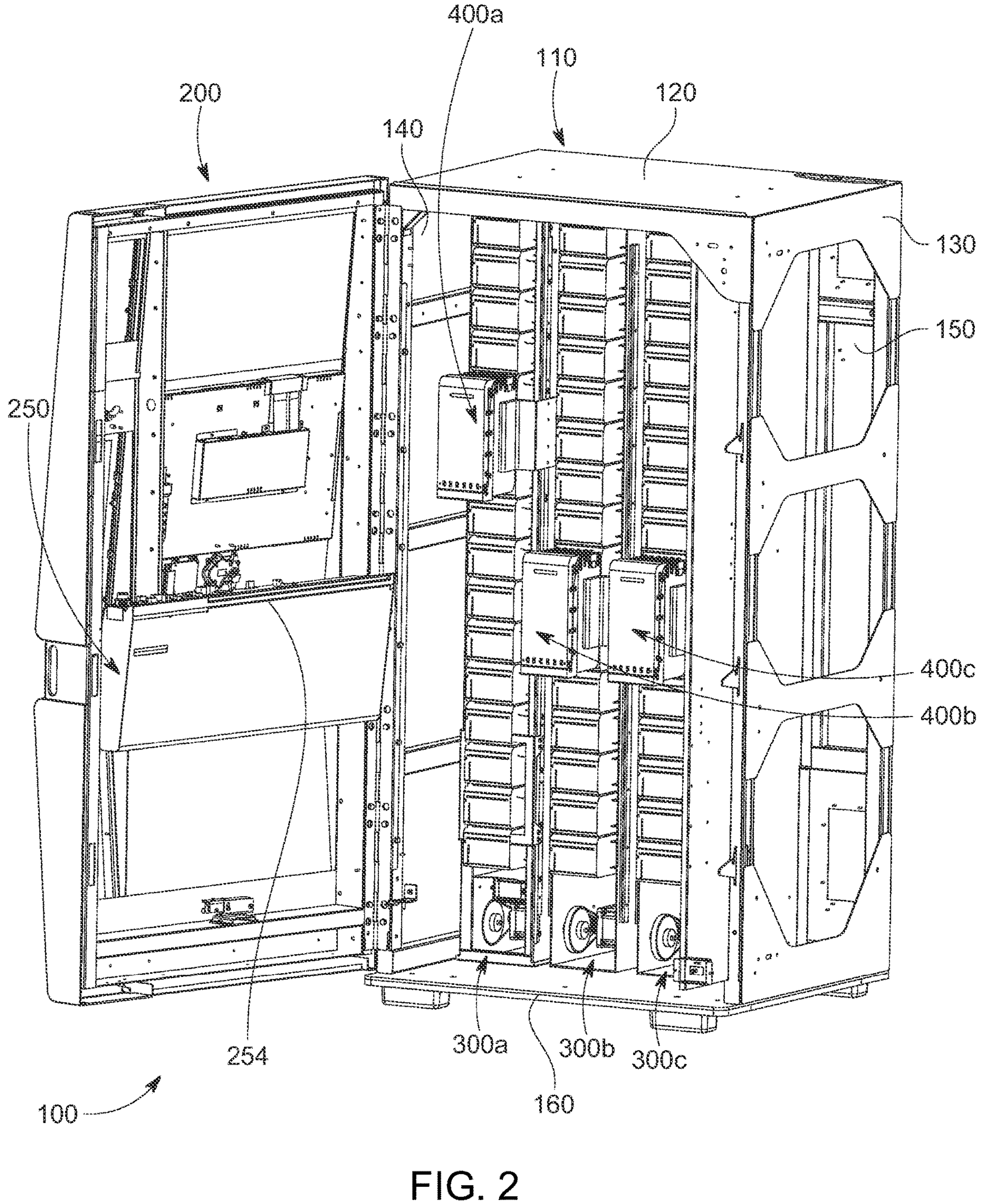
FIG. 2 is a front perspective view of the lottery ticket vending machine of FIG. 1 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 3:
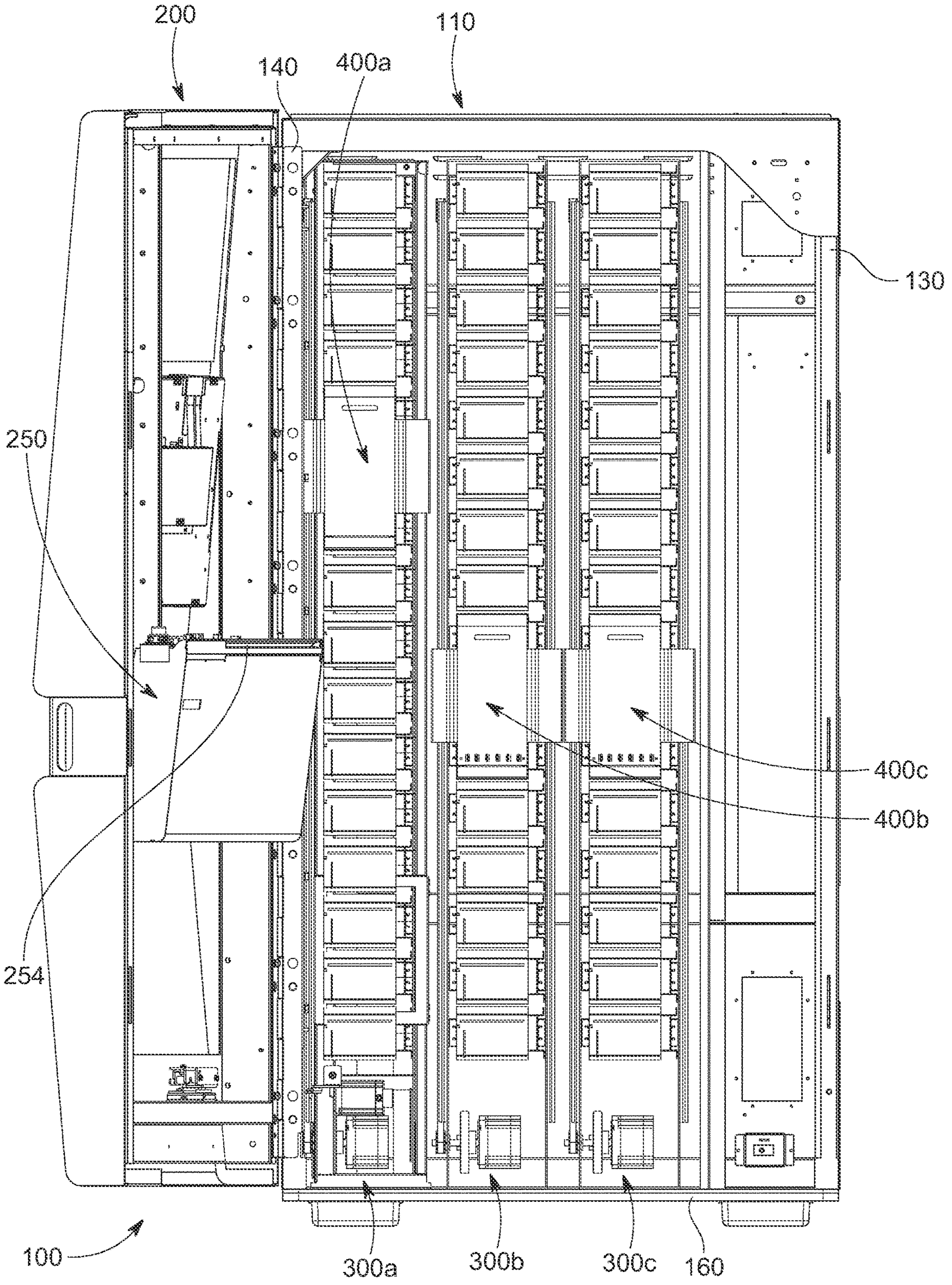
FIG. 3 is a front view of the lottery ticket vending machine of FIG. 1 shown with the front door thereof in the open position, shown with the left side wall panel thereof removed, showing the three ticket drawer columns and the three movable ticket bursters respectively associated the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending purchase ticket retrieval slot 278 (seen in FIG. 1). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. Likewise, each of the ticket drawers is identical in this example embodiment. For brevity, only ticket burster 400*a* associated with the ticket drawer column 300*a* is described herein and only one of the ticket drawers is described herein.

Figure 13:
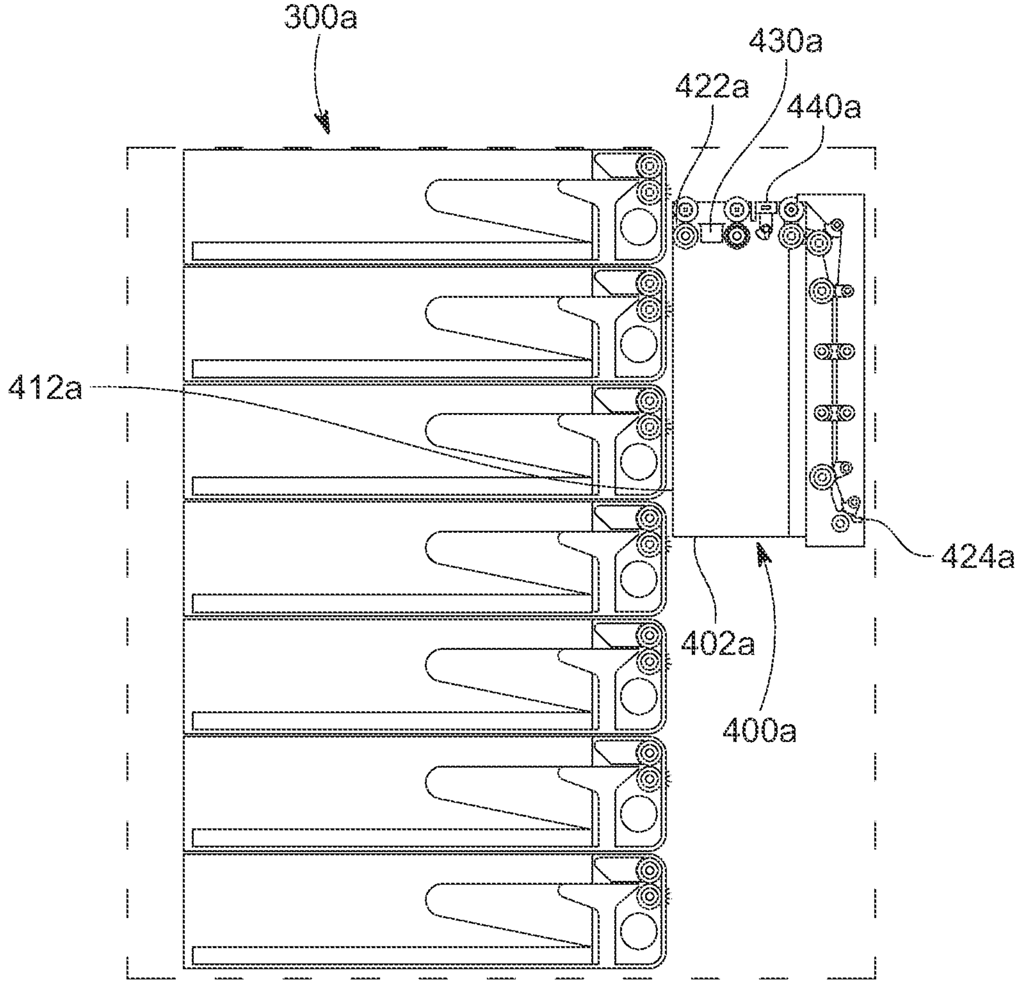
FIG. 13 is an enlarged side view of part of the ticket drawer column of FIG. 4, and the burster of FIG. 4 aligned with one of the ticket drawers thereof.
Figure 14:
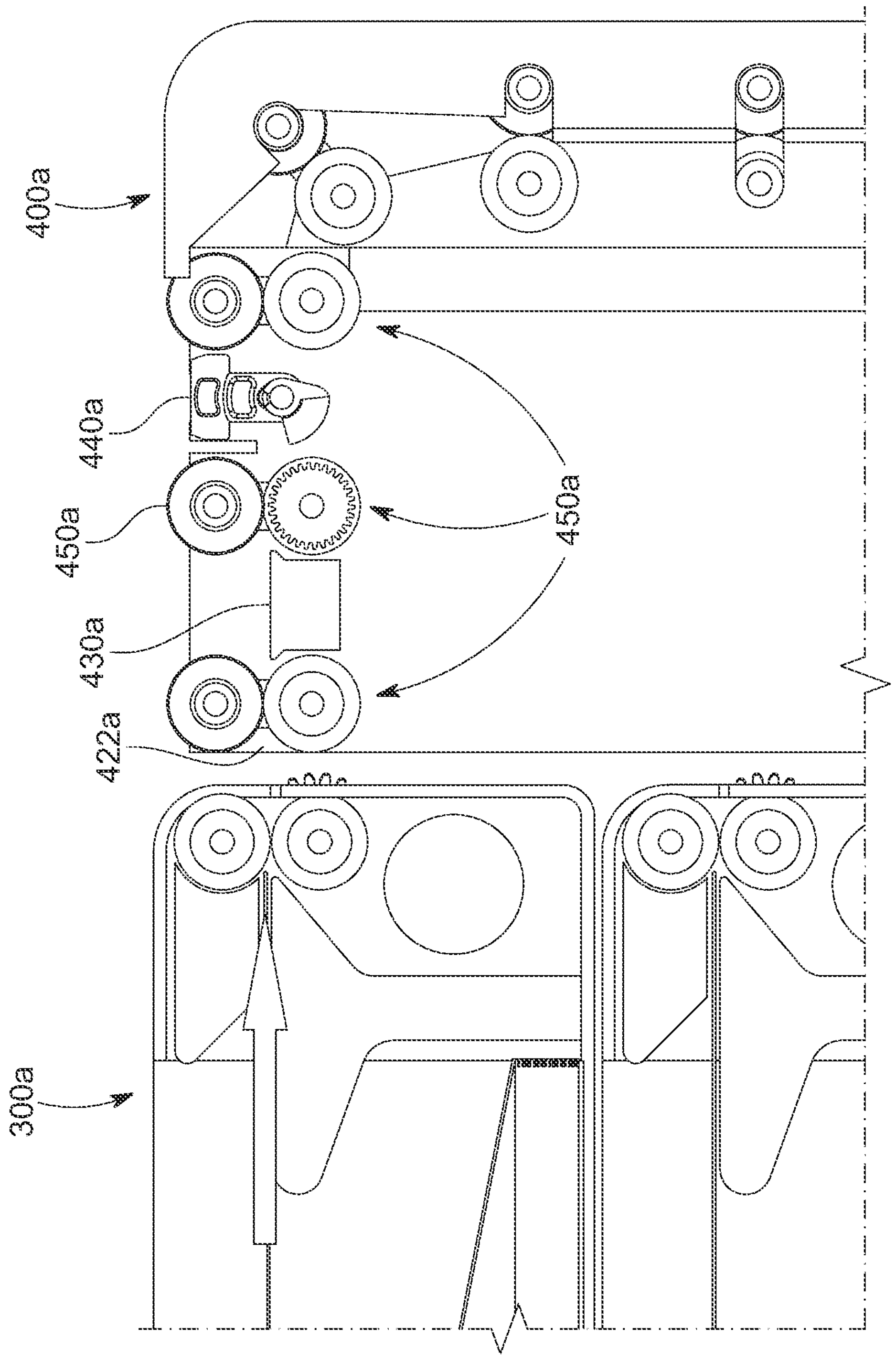
FIG. 14 is a further enlarged perspective view of part of the ticket drawer column of FIG. 4, and the burster of FIG. 5 aligned with one of the ticket drawers thereof.

Ticket drawer column 300*a* includes a series of aligned ticket drawers (not individually labeled except drawer 350) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. As further described below, each ticket drawer is configured to hold lottery tickets such as instant lottery tickets for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each instant lottery ticket held by that ticket drawer into the associated ticket burster 400*a* after the ticket burster 400*a* is moved into alignment with such ticket drawer for receipt, bursting, and dispensing of that lottery ticket (such as shown in FIGS. 13 and 14). This can be done via an actuator (not shown) of the ticket drawer, or caused by an actuator of the burster in different embodiments. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets that move into that ticket burster 400*a*.

In this example embodiment, each of the ticket drawers of each of the ticket drawer columns includes or is associated with a ticket indicator assembly configured provide an indication of a quantity of lottery tickets that are in that ticket drawer. In this example embodiment, the ticket indicator assemblies for the ticket drawers are identical so only ticket indicator assembly 360 associated with ticket drawer 350 is described herein for brevity.

In this example embodiment, the ticket drawer 350 includes a drawer housing 351 configured to hold one or more packs P of lottery tickets T, and thus a quantity of lottery tickets. The housing 351 includes a bottom wall 352, a front wall 353 connected to and extending upwardly from the bottom wall 353, a rear wall 354 connected to and extending upwardly from the bottom wall 353, a first side wall 355 connected to and extending upwardly from the bottom wall 353, a second side wall 356 connected to and extending upwardly from the bottom wall 353, and a partial top wall (not labeled) connected to the front wall 353, the first side wall 355, and the second side wall 356. The front wall 353 is connected to the first side wall 355 and the second side wall 356, and the rear wall 354 is also connected to the first side wall 355 and the second side wall 356. The front wall 353 is spaced-apart from the rear wall 354, and the first side wall 355 is spaced-apart from the second side wall 356, such that the bottom wall 352, the front wall 353, the rear wall 354, the first side wall 355, and the second side wall 356 define an interior ticket pack receipt and holding area A for the ticket drawer 350 that is configured to hold a plurality of lottery tickets T of one or more packs P. The housing 351 can also include one or more interior structures such as structure 358. The first side wall 355 of the housing 351 includes a first inner edge 355*a* that defines an elongated vertically extending pin receiving first slot 355*b*. The second side wall 356 of the housing 351 includes a second inner edge 356*a* that defines an elongated vertically extending pin receiving second slot 355*b*. The vertically extending first slot 355*b* is aligned with the vertically extending second slot 356*b*.

In this example embodiment, the ticket indicator assembly 360 includes a floating ticket engaging roller 362 and a ticket gauge 370. The floating ticket engaging roller 362 includes a cylindrical central ticket engager 364, a first pin 366 connected to and extending from a first end of the central ticket engager 364, and a second pin 368 connected to and extending from an opposite second end of the central ticket engager 364. The first pin 366 extends through and is vertically moveable in the first slot 355*b* in the first side wall 355 of the housing 351 of the ticket drawer 350. The second pin 368 extends through and is vertically moveable in the second slot 356*b* in the second side wall 356 of the housing 351 of the ticket drawer 350. The edges 355*a* and 356*a* of the first and second side walls thus limit the movement of the floating ticket engaging roller 362.

The central ticket engager 364 of the floating ticket engaging roller 362 is configured to rest on one of the lottery tickets of the pack P of lottery tickets positioned in the ticket drawer 350 such as shown in FIGS. 9, 10, 11, and 12. As lottery tickets are dispensed from the ticket drawer 350, the central ticket engager 364 of the floating ticket engaging roller 362 is configured to move downwardly (still resting on one of the tickets of the pack P of lottery tickets positioned in the ticket drawer 350). As this occurs, the first pin 366 moves downwardly in the first slot 355*b* and the second pin moves downwardly in the second slot 356*b* (due to gravity). In this example embodiment, the floating ticket engaging roller 362 is freely vertically movable and particularly the first pin 366 is freely movable in the first slot 355*b* and the second pin 368 is freely movable in the second slot 356*b*. It should also be appreciated that when lottery tickets are loaded in the ticket drawer 350, the central ticket engager 364 is configured to be moved upwardly and the lottery tickets are placed under the central ticket engager 364. The floating ticket engaging roller 362 can be alternatively sized, shaped, positioned, and otherwise configured in accordance with the present disclosure.

The ticket gauge 370 includes a gauge supporter 372 and a gauge 374 movably supported by the gauge supporter 372. The gauge supporter 372 is fixedly connected to the first side wall 355 of the housing 351 of the ticket drawer 350, although it can be otherwise suitably connected to the housing 351 of the ticket drawer 350. The gauge supporter 372 is stationary in this example embodiment. The gauge 374 extends though and is moveable in and relative to the gauge supporter 372. The gauge 374 is upwardly biased by an internal spring (not shown). The gauge 374 is sized, shaped, positioned, and otherwise configured to be engaged by the first pin 366. In this example embodiment, the gauge 374 is cylindrical and includes a top wall 375 that defines a pin receipt area (not labeled). The gauge 374 also includes an indicator 376 that is configured to be sensed by a sensor of or connected to the burster 400*a* as further explained below. The ticket gauge 370, the gauge supporter 372, and the gauge 374 can be differently sized, shaped, positioned, and otherwise configured in accordance with the present disclosure.

Figure 9:
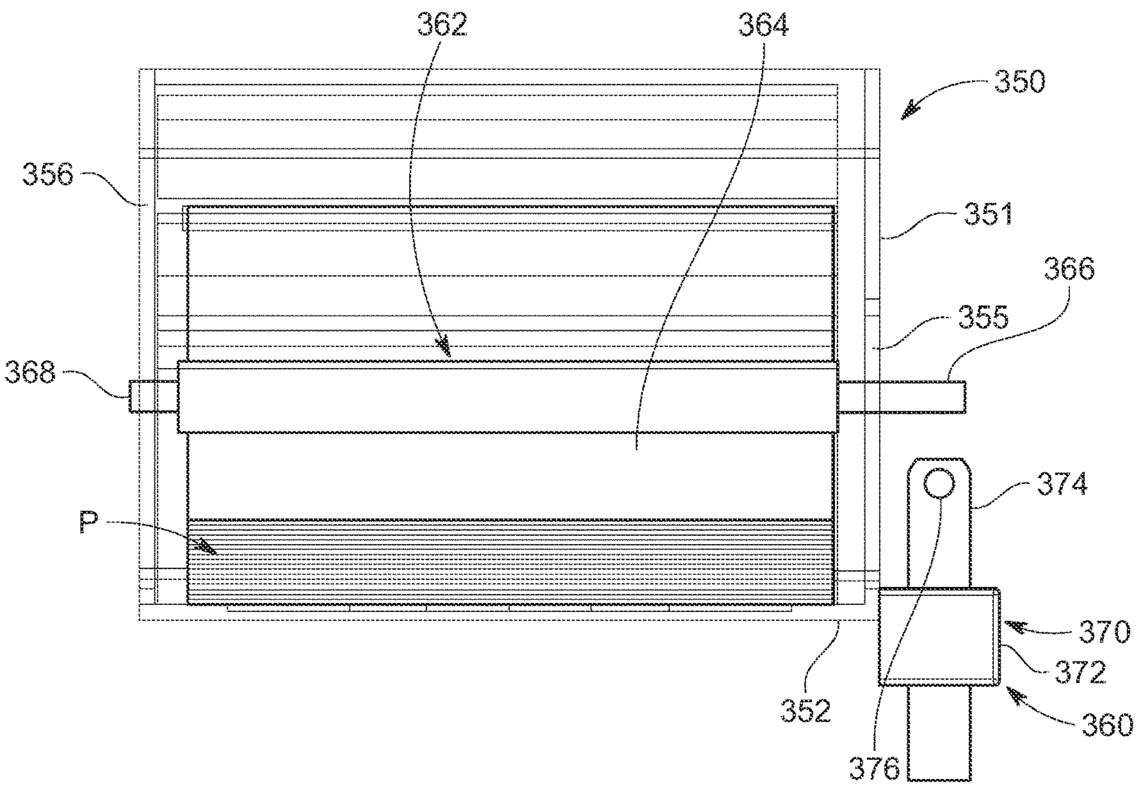
FIG. 9 is an enlarged diagrammatic front view of part of the ticket indicator assembly and the ticket drawer of FIG. 5.
Figure 11:
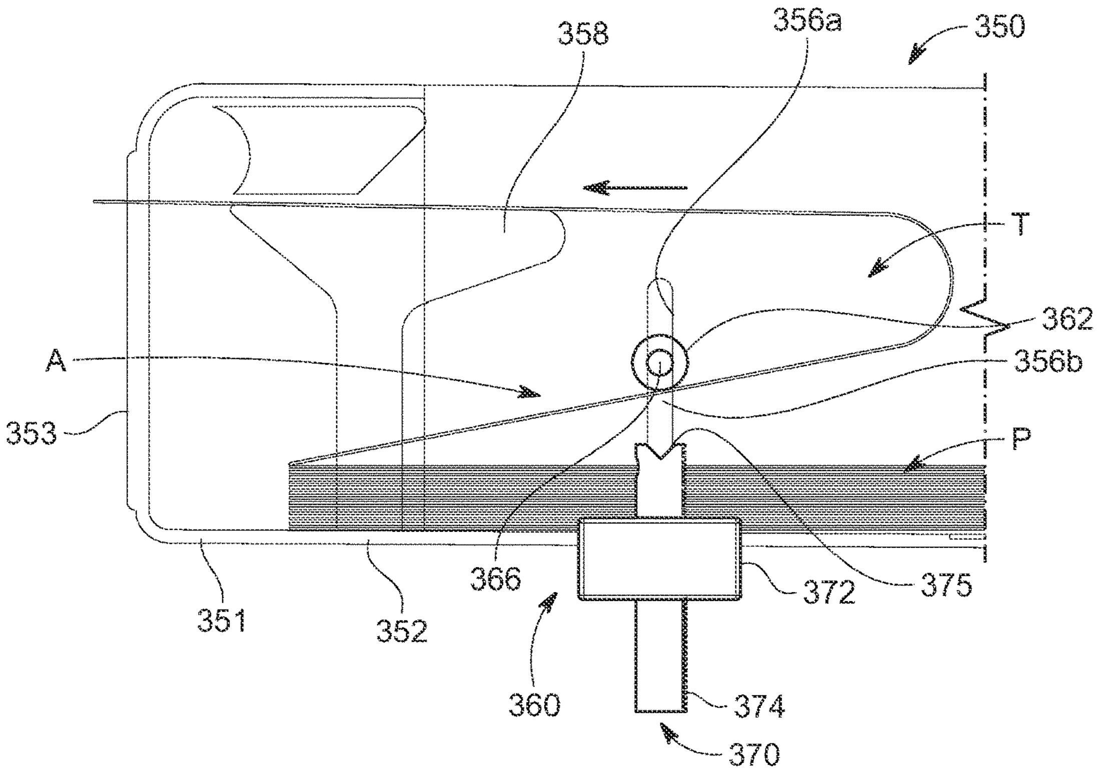
FIG. 11 is an enlarged diagrammatic side view of part of the ticket indicator assembly and the ticket drawer of FIG. 5.

In this example embodiment, when a relatively larger quantity of lottery tickets T are in the ticket drawer 350, the lottery tickets hold the floating ticket engaging roller 362 and the first pin 366 connected thereto in a relatively higher position such as shown in FIGS. 9 and 11. In this position, the first pin 366 is above and does not engage the gauge 374. In this position, the first pin 366 does not place any downward force on the gauge 374 and the gauge 374 is in its highest position. In this position, the indicator 376 of the gauge 374 is also in its highest position.

Figure 10:
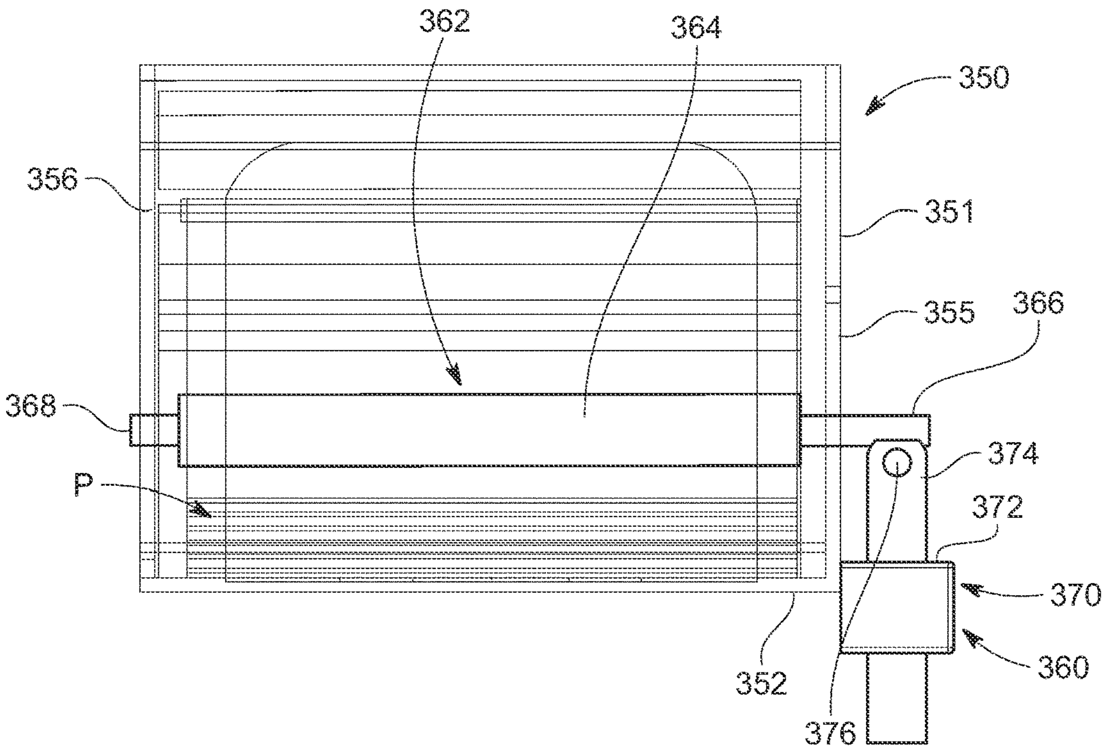
FIG. 10 is an enlarged diagrammatic front view of part of the ticket indicator assembly and the ticket drawer of FIG. 5.
Figure 12:
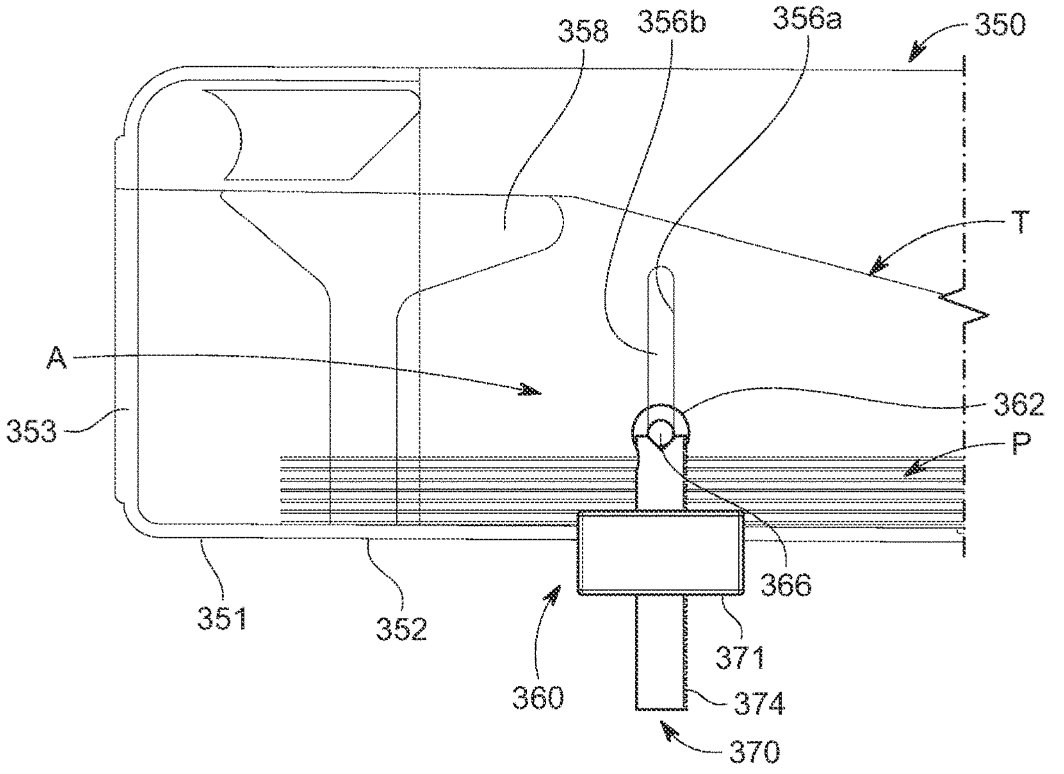
FIG. 12 is an enlarged diagrammatic side view of part of the ticket indicator assembly and the ticket drawer of FIG. 5.

In this example embodiment, when a relatively smaller quantity of lottery tickets T are in the ticket drawer 350, the lottery tickets hold the floating ticket engaging roller 362 and the first pin 366 connected thereto in a relatively lower position such as shown in FIGS. 10 and 12. In this position, the first pin 366 engages the gauge 374. In this position, the first pin 366 places downward force on the gauge 374 and the gauge 374 is in a lower position. In this position, the indicator 376 of the gauge 374 is also in a lower position.

In this example embodiment, when no lottery tickets T are in the ticket drawer 350, the floating ticket engaging roller 362 and the first pin 366 connected thereto are in their lowest position. In this position, the first pin 366 is engages the gauge 374. In this position, the first pin 366 places downward force on the gauge 374 and the gauge 374 is in its lowest position. In this position, the indicator 376 of the gauge 374 is also in its lowest position.

As further discussed below, the movable ticket burster 400*a* includes one or more sensors configured to sense the position of the indicator 376 of the gauge 374 of the indicator assembly 360 to enable a determination a quantity of tickets in the ticket drawer 350. The movable ticket burster 400*a* is moveable to a position associated with each of the ticket drawers in the ticket drawer column 300*a* and the one or more sensors are thus configured to sense the position of the indicator of the gauge of the indicator assembly for each ticket drawer in the ticket drawer column to enable a determination a quantity of tickets in that ticket drawer. Thus, the burster can be used to make these ticket quantity determinations.

Figure 4:
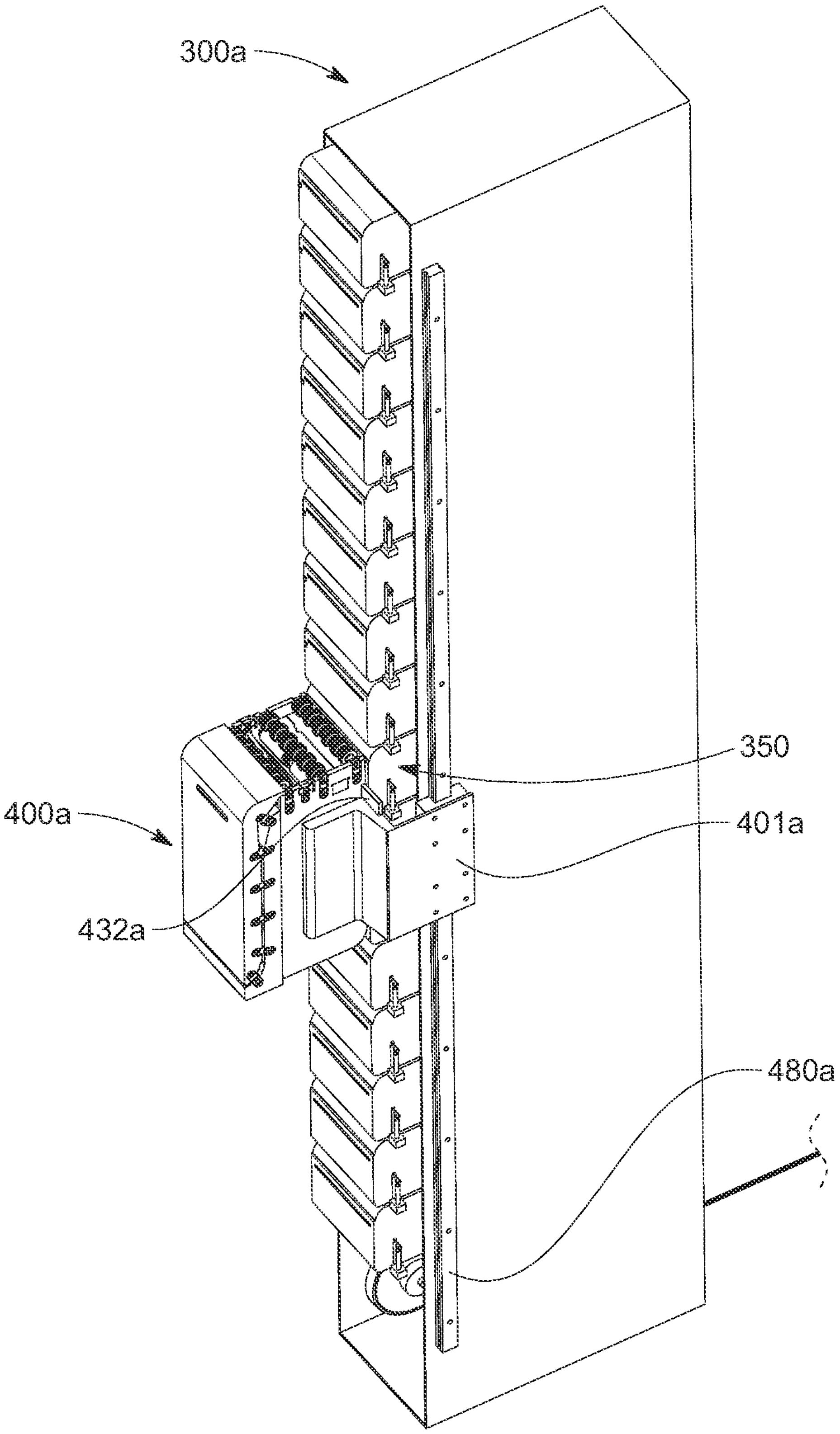
FIG. 4 is an enlarged fragmentary perspective view of one of the ticket drawer columns and the ticket burster associated with that ticket drawer column of the lottery ticket vending machine of FIG. 1.
Figure 5:
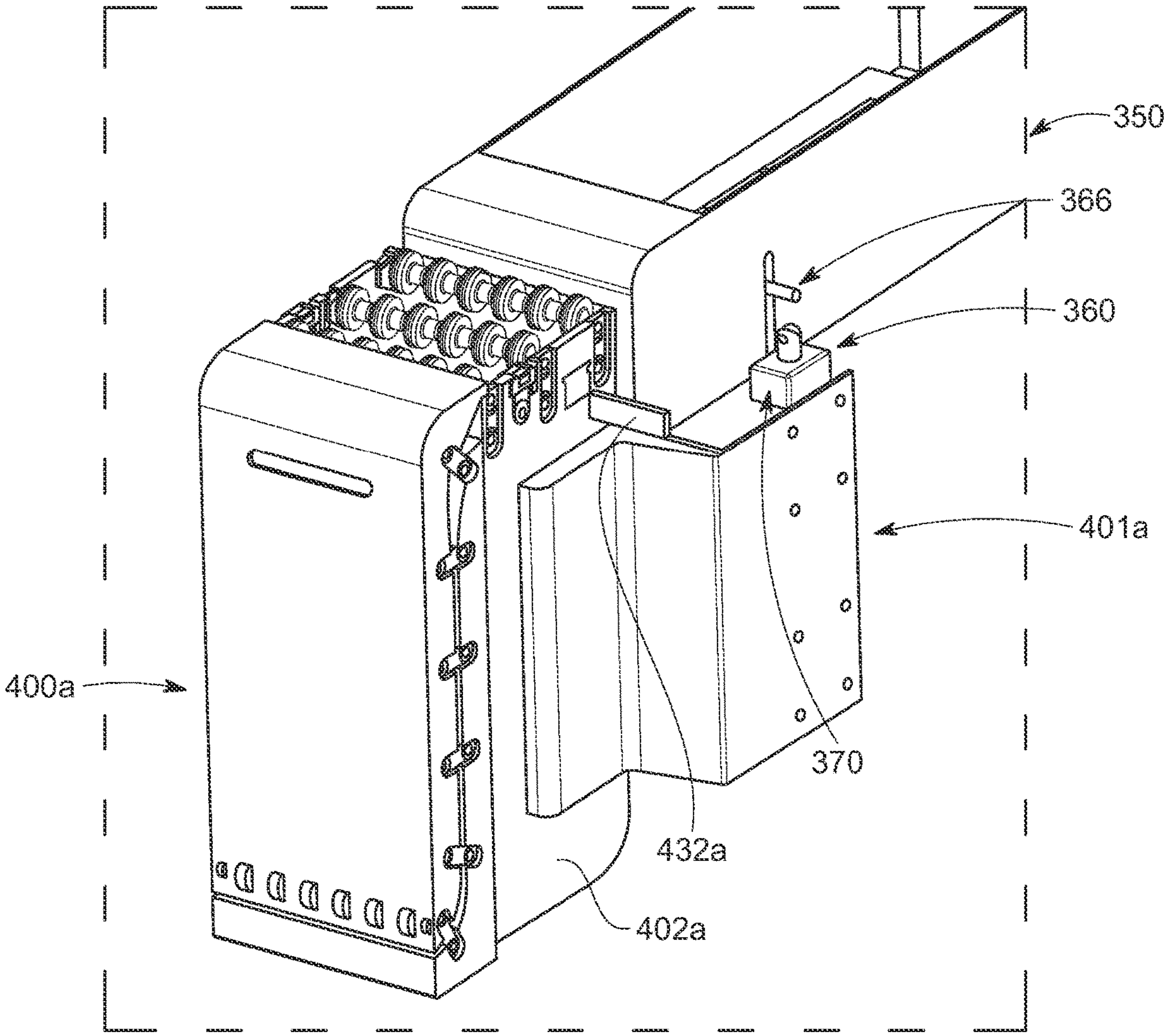
FIG. 5 is an enlarged fragmentary front perspective view of one of the ticket drawers of the ticket drawer column of FIG. 4 and the ticket burster of FIG. 4, and showing part of a ticket indicator assembly for the ticket drawer.
Figure 6:
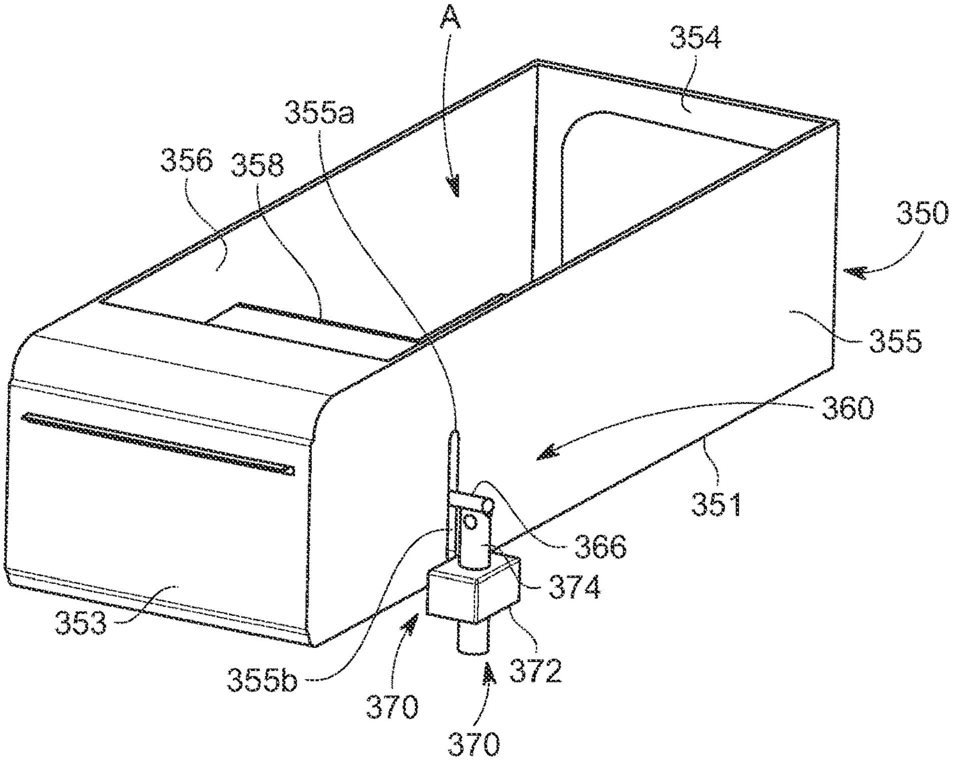
FIG. 6 is an enlarged front perspective view of the ticket indicator assembly and ticket drawer of FIG. 5.
Figure 7:
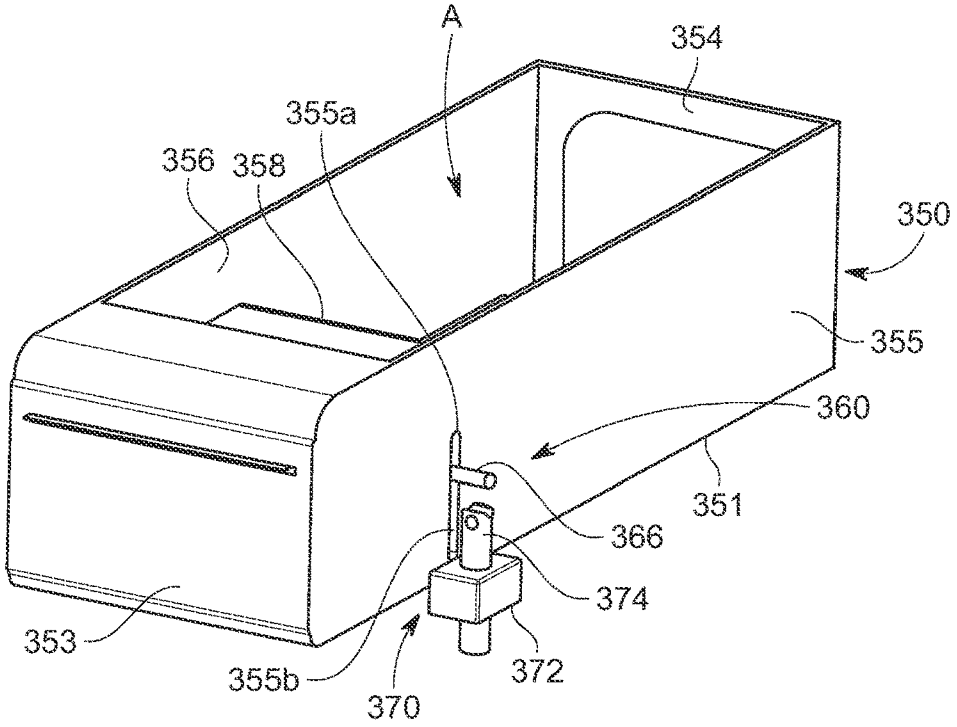
FIG. 7 is an enlarged front perspective view of the ticket indicator assembly and ticket drawer of FIG. 5.
Figure 8:
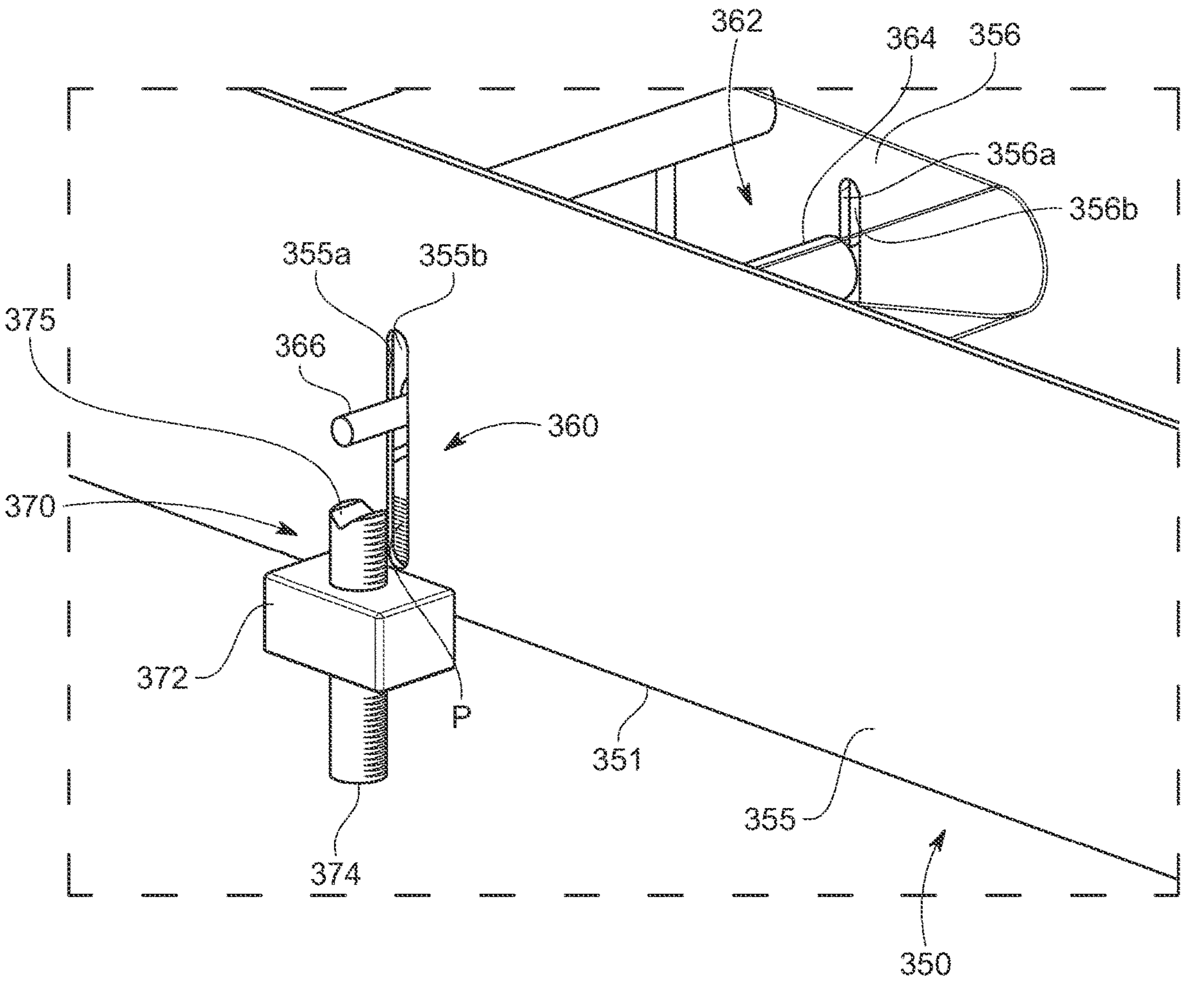
FIG. 8 is an enlarged fragmentary rear perspective view of part of the ticket indicator assembly and the ticket drawer of FIG. 5.

As best shown in FIGS. 4 and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that instant lottery ticket into the ticket receptacle 250 for the purchaser as requested by the purchaser.

As best shown in FIGS. 5, 13, and 14, the example movable ticket burster 400*a* generally includes: (a) a burster housing 402*a*; (b) one or more burster supporter connecters (such as burster support connector 401*a* connecting the burster housing 402*a* and the burster supporter 480*a*); (c) a first sensor 430*a* supported by the burster housing 402*a*; (d) a ticket cutter 440*a* in and supported by the burster housing 402*a*; (e) a plurality of ticket engagers 450*a* supported by the burster housing 402*a*; (f) a burster controller (not shown); and (g) a second sensor 432*a*. The size, shape, and configuration of the ticket burster can vary in accordance with the present disclosure.

More specifically, the burster housing 402*a* generally includes a top member (not labeled), spaced-apart side members (not labeled), a front member (not labeled), a rear member (not labeled), and a bottom member (not labeled). The burster housing 402*a* also includes a plurality of internal members (not individually labeled) that define a ticket inlet

422*a*, through which the ticket burster 400*a* is configured to receive a lottery ticket (such as lottery ticket T) from a ticket drawer of the ticket drawer column 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*.

The ticket cutter 440*a* is positioned in the burster housing 402*a* and configured to rotate to cut the perforations attaching each instant lottery ticket that moves along the ticket movement path in the ticket burster 400*a* to the next instant lottery ticket of the continuous strip of lottery tickets received from the respective ticket drawer. The ticket cutter 440*a* is configured to make such cut along the perforations between the two connected instant lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the instant lottery ticket requested by the purchaser from the respective ticket drawer, the ticket drawer can retract the portion of the next instant lottery ticket (of the strip of lottery tickets) from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each instant lottery ticket along the perforations connecting that instant lottery ticket to the next lottery ticket in the strip. In such embodiments, the ticket drawer may not need to withdraw the next instant lottery ticket of the strip or may only need to withdraw the next instant lottery ticket of the strip a relatively small distance. In such embodiments, the ticket burster may not need a ticket cutter.

The ticket burster 400*a* is configured to burst the perforations between the lottery ticket being dispensed and the next lottery ticket of the strip so as to enable the dispensed lottery ticket to be dispensed into the ticket receptacle 250. This prevents a person from being able to pull an extended number of lottery tickets from one of the ticket packs in one of the ticket drawers. It should be appreciated that the ticket burster 400*a* can be moved to a dispensing location for each instant lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

The ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the sensor 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the sensor.

The first sensor 430*a* of the ticket burster 400*a* is positioned in and supported by the housing 402*a* of the ticket burster 400*a*. The first sensor 430*a* extends transversely along a portion of the entire width of the ticket burster 430*a* such that it can sense a code (such as a bar code) or other information from a lottery ticket that moves through the burster 400*a*. In alternative embodiments that are not shown, the first sensor 430*a* is in another suitable location. The first sensor 430*a* is configured to obtain an image of the lottery ticket. The first sensor 430*a* is configured to communicate data (regarding the lottery ticket) to the burster controller and/or the controller of the ticket vending machine 100. The burster controller and/or the controller of the ticket vending machine 100 are configured to use this data regarding the lottery ticket.

The second sensor 432*a* of the ticket burster 400*a* extends from the housing 402*a* and is supported by the housing 402*a* of the ticket burster 400*a*. The second sensor 432*a* is configured to be aligned with the indicator 376 of the gauge 374 such that it can sense one or more positions of the indicator 376 and thus the position of the gauge 374. In this example embodiment, the second sensor 432*a* is on one side of the housing. In other alternative embodiments that are not shown, the second sensor 432*a* is in another suitable location. The second sensor 432*a* is configured to obtain data regarding a position of the indicator 376. The second sensor 432*a* is configured to communicate data (regarding the indicator position) to the burster controller and/or the controller of the ticket vending machine 100. The burster controller and/or the controller of the ticket vending machine 100 are configured to analyze this data and determine a quantity of lottery tickets in the ticket drawer associated with the indicator based on this data. In various embodiments, this quantity is an exact quantity of lottery tickets. In various embodiments, this quantity is a range of quantities of lottery tickets. In various embodiments, this quantity is more general such as an approximation that the ticket drawer is about full, about half full, or about empty. In various embodiments, the second sensor includes one or more cameras configured to take one or more images, create data based on the images, and send the data to the controller(s) for analysis. In various embodiments, the second sensor includes one or more optical sensors configured to create data based on the optical readings, and send the data to the controller(s) for analysis. In various such embodiments, the optical sensor can be configured to determine the level of lottery tickets in the ticket drawer each time the burster travels to that ticket drawer. In various other embodiments, the second sensor can include one or more mechanical switches, one or more potentiometers, one or more mechanical flags, or one or more closable contacts or other suitable devices for the detection of the indicator 376. For example, for a switch or flag, the gauge can be a racket type device that as it moves down would move a secondary member into place that would equate with a specific designated level in the ticket bin that would be detected once a ticket was pulled from the drawer. In another example, with a potentiometer, a wiper on the burster can determine the level of the indicator 376 via a resistance or equivalent function.

The burster controller and/or the controller of the ticket vending machine 100 can be configured to take one or more actions based on the determined quantity of lottery tickets in each ticket drawer. In certain instances, the burster controller and/or the controller of the ticket vending machine 100 does not need to take any action. In other instances, the burster controller and/or the controller of the ticket vending machine 100 can take one or more of a series of different actions based on the quantities. In various different embodiments, the respective action taken can vary and can be any one or more of the following example actions: (1) alert the controller(s) of such ticket levels so that the controller(s) can be prepared to function based on same; (2) cause a display of a message on a display device of the vending machine 100 to alert an operator of the vending machine 100 regarding the quantity of lottery tickets in a ticket drawer to enable the operator to act on such quantity; and/or (3) send a message to a remote monitoring device separate from the vending machine regarding the quantity to enable an operator to act on such issue.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

At one or more points during the operation of the vending machine 100, the controller of the lottery ticket vending machine 100 can cause the vending machine 100 to determine an inventory of lottery tickets in one or more of the ticket drawers. To do so, the burster controller and/or the controller of the ticket vending machine 100 cause the burster associated with each of the ticket drawers to obtain quantity information regarding that ticket drawer based on the second sensor of the burster moving into an alignment position with that ticket drawer to enable the second sensor to obtain data based on the position of the indicator of the gauge associated with that ticket drawer. The burster controller and/or the controller of the ticket vending machine 100 can then determine the quantity and take one or more of the series of suitable actions based on such quantities.

It should be appreciated from the above that various embodiments of the present disclosure provide a lottery ticket vending machine comprising: a housing; a ticket drawer in the housing, the ticket drawer configured to hold lottery tickets; a ticket indicator assembly comprising a ticket engaging roller in the ticket drawer and a movable gauge connected to the ticket drawer; a ticket burster in the housing, the ticket burster defining a ticket inlet and a ticket outlet, the ticket burster movable to a position associated with and the ticket drawer; a sensor supported by the ticket burster, configured to sense a position of the gauge to obtain data based on a quantity of lottery tickets in the ticket drawer, and configured to transmit the data; and a controller configured to receive the data from the sensor, and determine the quantity of lottery tickets in the ticket drawer. In various such embodiments, the quantity is an approximate quantity. In various such embodiments, the ticket engaging roller is movable toward and away from a bottom wall of the ticket drawer. In various such embodiments, the ticket engaging roller includes a cylindrical central ticket engager, a first pin connected to and extending from a first end of the central ticket engager, and a second pin connected to and extending from an opposite second end of the central ticket engager. In various such embodiments, the ticket drawer comprises a first side wall and a second side wall, wherein the first side wall comprises a first inner edge that defines an elongated first slot, wherein the second side wall comprises an elongated second slot, wherein the first pin extends through the first slot and the second pin extends through the second slot. In various such embodiments, the central ticket engager is configured to move downwardly as lottery tickets are dispensed from the ticket drawer. In various such embodiments, the gauge comprises a top wall that defines a pin receipt area. In various such embodiments, the ticket indicator assembly comprises a gauge supporter configured to movably support the gauge. In various such embodiments, the gauge supporter is connected to the ticket drawer. In various such embodiments, the gauge supporter supports a spring configured to bias the gauge upwardly. In various such embodiments, the gauge comprises an indicator configured to be sensed by the sensor. In various such embodiments, the sensor extends outwardly from a housing of the ticket burster.

It should further be appreciated from the above that various embodiments of the present disclosure provide a lottery ticket vending machine comprising: a housing; a plurality of ticket drawers in the housing, each ticket drawer configured to hold lottery tickets; a plurality of ticket indicator assemblies in the housing, each ticket indicator assembly associated with a different one of the drawers; a ticket burster in the housing, the ticket burster defining a ticket inlet and a ticket outlet, the ticket burster movable to different positions respectively associated with the ticket drawers; and a sensor supported by the ticket burster, the sensor configured to, for each of the ticket drawers, sense a position of part of the ticket indicator assembly associated with that ticket drawer to obtain data based on a quantity of lottery tickets in the ticket drawer, and configured to transmit the data to a controller to determine a quantity of lottery tickets in the ticket drawer. In various such embodiments, each of the quantities is an approximate quantity. In various such embodiments, each ticket indicator assembly comprises a gauge supporter configured to movably support a gauge. In various such embodiments, for each ticket indicator assembly, the gauge supporter supports a spring configured to bias the gauge upwardly. In various such embodiments, for each ticket indicator assembly, the gauge comprises an indicator configured to be sensed by the sensor.

It should further be appreciated from the above that various embodiments of the present disclosure provide a lottery ticket vending machine comprising: a housing; a ticket drawer in the housing configured to hold lottery tickets; a ticket indicator assembly connected to the ticket drawer; a ticket burster in the housing, the ticket burster defining a ticket inlet and a ticket outlet, the ticket burster movable to a position associated with and the ticket drawer; a sensor supported by the ticket burster, configured to sense a position of part of the ticket indicator assembly, and configured to transmit data based on the position of the part of the ticket indicator assembly; and a controller configured to receive the data from the sensor, and determine a quantity of lottery tickets that are in the ticket drawer. In various such embodiments, the quantity is an approximate quantity. In various such embodiments, the ticket indicator assembly comprises a gauge comprising an indicator configured to be sensed by the sensor.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:
- a housing;
- a ticket drawer in the housing, the ticket drawer configured to hold lottery tickets, the ticket drawer comprising a side wall that defines a first slot;
- a ticket indicator assembly comprising:
  - a ticket engaging roller in the ticket drawer, the ticket engaging roller comprising a ticket engager, a first pin connected to and extending from a first end of the ticket engager, the first pin upwardly and downwardly moveable in the first slot, the ticket engager positioned to move downwardly as lottery tickets in the ticket drawer are dispensed from the ticket drawer, and
  - a ticket gauge outside of the ticket drawer, the ticket gauge comprising a gauge supporter and a movable gauge supported by the gauge supporter, the movable gauge comprising an indicator;
- a ticket burster in the housing, the ticket burster defining a ticket inlet and a ticket outlet, the ticket burster movable to a position associated with and the ticket drawer;
- a sensor supported by the ticket burster, configured to sense a position of the movable gauge to obtain data based on a quantity of lottery tickets in the ticket drawer, and configured to transmit the data; and
- a controller configured to receive the data from the sensor, and determine the quantity of lottery tickets in the ticket drawer.

2. The lottery ticket vending machine of claim 1, wherein the quantity is an approximate quantity.

3. The lottery ticket vending machine of claim 1, wherein the ticket engaging roller is movable toward and away from a bottom wall of the ticket drawer.

4. The lottery ticket vending machine of claim 1, wherein the ticket engaging roller includes a second pin connected to and extending from an opposite second end of the ticket engager.

5. The lottery ticket vending machine of claim 4, wherein the ticket drawer comprises a second side wall, wherein the first side wall comprises a first inner edge that defines the first slot, wherein the second side wall defines a second slot, wherein the first pin extends through the first slot and the second pin extends through the second slot.

6. The lottery ticket vending machine of claim 1, wherein the movable gauge comprises a top wall that defines a pin receipt area.

7. The lottery ticket vending machine of claim 1, wherein the gauge supporter is connected to the ticket drawer.

8. The lottery ticket vending machine of claim 1, wherein the gauge supporter supports a spring configured to bias the movable gauge upwardly.

9. The lottery ticket vending machine of claim 1, wherein the sensor is an optical sensor and the indicator is configured to be sensed by the optical sensor.

10. The lottery ticket vending machine of claim 1, wherein the sensor extends outwardly from a ticket burster housing of the ticket burster.

11. A lottery ticket vending machine comprising:
- a housing;
- a plurality of ticket drawers in the housing, each ticket drawer configured to hold lottery tickets, each of the ticket drawers comprising a side wall that defines a vertically extending slot;
- a plurality of ticket indicator assemblies in the housing, each ticket indicator assembly associated with a different one of the ticket drawers, each ticket indicator assembly for each ticket drawer comprising:
  - a ticket engaging roller in the ticket drawer, the ticket engaging roller comprising a ticket engager, a pin connected to and extending from an end of the ticket engager, the pin upwardly and downwardly moveable in the slot, the ticket engager positioned to move downwardly as lottery tickets in the ticket drawer are dispensed from the ticket drawer, and
  - a ticket gauge outside of the ticket drawer, the ticket gauge comprising a gauge supporter and a movable gauge supported by the gauge supporter, the gauge comprising an indicator;
- a ticket burster in the housing, the ticket burster defining a ticket inlet and a ticket outlet, the ticket burster movable to different positions respectively associated with the ticket drawers; and
- a sensor supported by the ticket burster, the sensor configured to, for each of the ticket drawers, sense a position of the indicator of the ticket indicator assembly associated with the ticket drawer to obtain data based on a quantity of lottery tickets in the ticket drawer, and configured to transmit the data to a controller to determine a quantity of lottery tickets in the ticket drawer.

12. The lottery ticket vending machine of claim 11, wherein each of the quantities is an approximate quantity.

13. The lottery ticket vending machine of claim 11, wherein for each ticket indicator assembly, the gauge supporter supports a spring configured to bias the gauge upwardly.

14. The lottery ticket vending machine of claim 11, wherein for each ticket indicator assembly, the sensor is an optical sensor and the indicator is configured to be sensed by the optical sensor.

15. A lottery ticket vending machine comprising:

a housing;

a ticket drawer in the housing configured to hold lottery tickets, the housing defining a slot;

a ticket indicator assembly connected to the ticket drawer, the ticket indicator assembly comprising:

a ticket engaging roller in the ticket drawer, the ticket engaging roller comprising a ticket engager, a pin connected to and extending from the ticket engager, the pin upwardly and downwardly moveable in the slot, the ticket engager positioned to move downwardly as lottery tickets in the ticket drawer are dispensed from the ticket drawer, and a ticket gauge outside of the ticket drawer, the ticket gauge comprising a gauge supporter and a movable gauge supported by the gauge supporter;

a ticket burster in the housing, the ticket burster defining a ticket inlet and a ticket outlet, the ticket burster movable to a position associated with and the ticket drawer;

a sensor supported by the ticket burster, configured to sense a position of part of the gauge, and configured to transmit data based on the position of the gauge; and a controller configured to receive the data from the sensor, and determine a quantity of lottery tickets that are in the ticket drawer.

16. The lottery ticket vending machine of claim 15, wherein the quantity is an approximate quantity.

17. The lottery ticket vending machine of claim 15, wherein the gauge comprises an indicator configured to be sensed by the sensor.

* * * * *